United States Patent
Laraqui et al.

(10) Patent No.: US 10,728,720 B2
(45) Date of Patent: Jul. 28, 2020

(54) SYSTEM AND METHOD FOR PROVIDING 3GPP BASED COMMUNICATIONS IN AN INDOOR ENVIRONMENT

(71) Applicant: Telefonaktiebolaget LM Ericsson (publ), Stockholm (SE)

(72) Inventors: Kim Laraqui, Solna (SE); Sándor Albrecht, Sundbyberg (SE); Henrik Almeida, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/763,560

(22) PCT Filed: Nov. 12, 2015

(86) PCT No.: PCT/SE2015/051210
§ 371 (c)(1),
(2) Date: Mar. 27, 2018

(87) PCT Pub. No.: WO2017/082789
PCT Pub. Date: May 18, 2017

(65) Prior Publication Data
US 2018/0295480 A1    Oct. 11, 2018

(51) Int. Cl.
*H04W 76/15*    (2018.01)
*H04W 4/33*    (2018.01)
(Continued)

(52) U.S. Cl.
CPC .......... *H04W 4/33* (2018.02); *H04B 7/15507* (2013.01); *H04W 40/02* (2013.01);
(Continued)

(58) Field of Classification Search
CPC ..... H04W 76/15; H04W 40/02; H04W 72/02; H04W 4/33; H04W 84/045; H04W 88/04; H04W 88/08; H04B 7/15507
(Continued)

(56) References Cited

U.S. PATENT DOCUMENTS

2009/0280819 A1* 11/2009 Brisebois ............ H04W 52/244
455/446
2011/0183678 A1    7/2011 Kerpez et al.
(Continued)

FOREIGN PATENT DOCUMENTS

| CN | 103826300 A | 5/2014 |
|---|---|---|
| CN | 103901456 A | 7/2014 |

(Continued)

OTHER PUBLICATIONS

International Search Report and Written Opinion for International Patent Application No. PCT/SE2015/051210, dated Aug. 9, 2016, 11 pages.
(Continued)

*Primary Examiner* — Phong La
(74) *Attorney, Agent, or Firm* — Withrow & Terranova, PLLC

(57) ABSTRACT

Example embodiments presented herein are directed towards an indoor base station and an indoor service node, as well as corresponding methods therein, for providing Third Generation Partnership Project (3GPP) based communications for at least one wireless device in an indoor environment. The example embodiments presented herein provide a merged system with centralized control featuring wired and wireless access for 3GPP based communications in an indoor environment.

12 Claims, 7 Drawing Sheets

(51) Int. Cl.
    *H04B 7/155* (2006.01)
    *H04W 40/02* (2009.01)
    *H04W 72/02* (2009.01)
    *H04W 84/04* (2009.01)
    *H04W 88/04* (2009.01)
    *H04W 88/08* (2009.01)
(52) U.S. Cl.
    CPC ........... *H04W 72/02* (2013.01); *H04W 76/15* (2018.02); *H04W 84/045* (2013.01); *H04W 88/04* (2013.01); *H04W 88/08* (2013.01)
(58) Field of Classification Search
    USPC ....................................................... 370/315
    See application file for complete search history.

(56) References Cited

U.S. PATENT DOCUMENTS

| | | | | |
|---|---|---|---|---|
| 2011/0280127 | A1* | 11/2011 | Raaf | H04L 45/125 370/230 |
| 2014/0269349 | A1* | 9/2014 | Ramachandran | H04W 76/19 370/248 |
| 2015/0071248 | A1* | 3/2015 | Faerber | H04W 36/0055 370/331 |
| 2015/0146599 | A1* | 5/2015 | Jha | H04L 5/0032 370/311 |
| 2017/0111956 | A1* | 4/2017 | Koc | H04W 88/06 |
| 2017/0295522 | A1* | 10/2017 | Shalev | H04W 36/0022 |
| 2018/0288658 | A1* | 10/2018 | Shalev | H04W 36/14 |

FOREIGN PATENT DOCUMENTS

| | | |
|---|---|---|
| CN | 104702334 A | 6/2015 |
| EP | 2566280 A2 | 3/2013 |
| WO | 2012023887 A1 | 2/2012 |

OTHER PUBLICATIONS

First Office Action and Search Report for Chinese Patent Application No. 201580084528.4, dated May 6, 2020, 19 pages.

\* cited by examiner

SYSTEM AND METHOD FOR PROVIDING 3GPP BASED COMMUNICATIONS IN AN INDOOR ENVIRONMENT

This application is a 35 U.S.C. § 371 national phase filing of International Application No. PCT/SE2015/051210, filed Nov. 12, 2015, the disclosure of which is incorporated herein by reference in its entirety.

TECHNICAL FIELD

Example embodiments presented herein are directed towards an indoor base station and a system comprising such an indoor base station, as well as corresponding methods therein, for providing 3GPP based communications for at least one wireless device in an indoor environment.

BACKGROUND

In a typical cellular system, also referred to as a wireless communications network, wireless terminals, also known as mobile stations and/or user equipment units communicate via a Radio Access Network (RAN) to one or more core networks. The wireless terminals can be Machine-to-Machine (M2M) devices, Internet-of-Things devices, mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) and LTE-Advanced (LTE-A) together with Evolved Packet Core (EPC) is the newest addition to the 3GPP family. 5G is also projected to evolve from known concepts in LTE/LTE-Advanced, as part of 3GPP and associated bodies.

SUMMARY

It is projected that most wireless/mobile traffic will be generated indoor. A substantial part of that indoor traffic will be generated by devices in residential areas, and it is foreseen in general that all devices eventually will connect wirelessly to their various access points, be it WiFi, 3GPP or other. Irrespective of technology, such an access point shall be referred to herein as "wireless". Specifically, we do not necessarily need to distinguish between wireless and mobile at this stage.

The residential wireless access points that provide wireless connectivity will be connected to the rest of the network mainly via xDSL, for example, variants of DSL technologies, and xPON, for example, various Passive-Optical-Network technologies, links. The wireless access is managed and controlled separately from those fixed links.

A need exists for an end-to-end solution capable of addressing the need for increased wireless connectivity inside a residential, or in general an indoor, environment. At least one object of some of the example embodiments presented herein is to present a system in which wireless access is merged with broadband access in order to increase and optimize wireless connectivity in an indoor environment.

At least one example advantage of some of the example embodiments presented herein is the optimization of broadband access. A further example advantage is providing such a merged system without the need or a separate access control. The 3GPP access control may be used for the broadband access link as only legitimate radio bearers will flow over the broadband access link.

A further example advantage is that WiFi may be provided as a tethering service by an emulated user equipment inside an indoor service node. This will enable operators to transform the management of residential WiFi into a management standard of tethering 3GPP user equipments.

Accordingly, some of the example embodiments are directed towards an indoor base station, situated in an indoor environment, for providing 3GPP based communications for at least one wireless device in the indoor environment. The indoor base station comprises a processor and a memory, where memory comprising instructions executable by said processor whereby said indoor base station is operative to receive, from a radio network via a BBA, the 3GPP based communications. The BBA is scheduled and controlled by the indoor base station for communications between the indoor base station and the radio network. The indoor base station is further operative to transmit, to the at least one wireless device, the 3GPP based communications.

Some of the example embodiments are directed towards a method, in an indoor base station situated in an indoor environment, for providing 3GPP based communications for at least one wireless device in the indoor environment. The method comprises receiving, from a radio network via a BBA, the 3GPP based communications. The BBA is scheduled and controlled by the indoor base station for communications between the indoor base station and the radio network. The method also comprises transmitting, to the at least one wireless device, the 3GPP based communications.

Some of the example embodiments are directed towards an indoor service node comprising the indoor base station described above. The indoor service node further comprises an emulated user equipment configured to establish a back-to-back connection with the indoor base station. The node comprises a processor and a memory. The memory comprises instructions executable by the processor whereby the indoor service node is operative to transmit, to the at least one wireless device, the 3GPP communications via a wireless access point provided by the emulated user equipment.

Some of the example embodiments are directed towards the method described above, further comprising an indoor service node. The indoor service node comprises the indoor base station and further comprises an emulated user equipment configured to establish a back-to-back connection with the indoor base station. The method further comprises transmitting, to the at least one wireless device, the 3GPP communications via a wireless access point provided by the emulated user equipment.

ABBREVIATIONS

3GPP Third Generation Partnership Project
BBA Broadband Access
BBF Broadband Forum
BSC Base Station Controller
CPE Customer Premises Equipment
DSL Digital Subscriber Line
DSLAM Digital Subscriber Line Access Multiplexer
eNB Evolved NodeB
EPC Evolved Packet Core
E-UTRAN Evolved Universal Terrestrial Radio Access Network
GERAN GSM/EDGE Radio Access Network
GSM Global System for Mobile Communications
IoT Internet of Things
LTE Long Term Evolution
M2M Machine-to-Machine
PON Passive Optical Network
RAN Radio Access Network
RBS Radio Base Station
RNC Radio Network Controller
UE User Equipment
UMTS Universal Mobile Telecommunications System
USB Universal Serial Bus
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
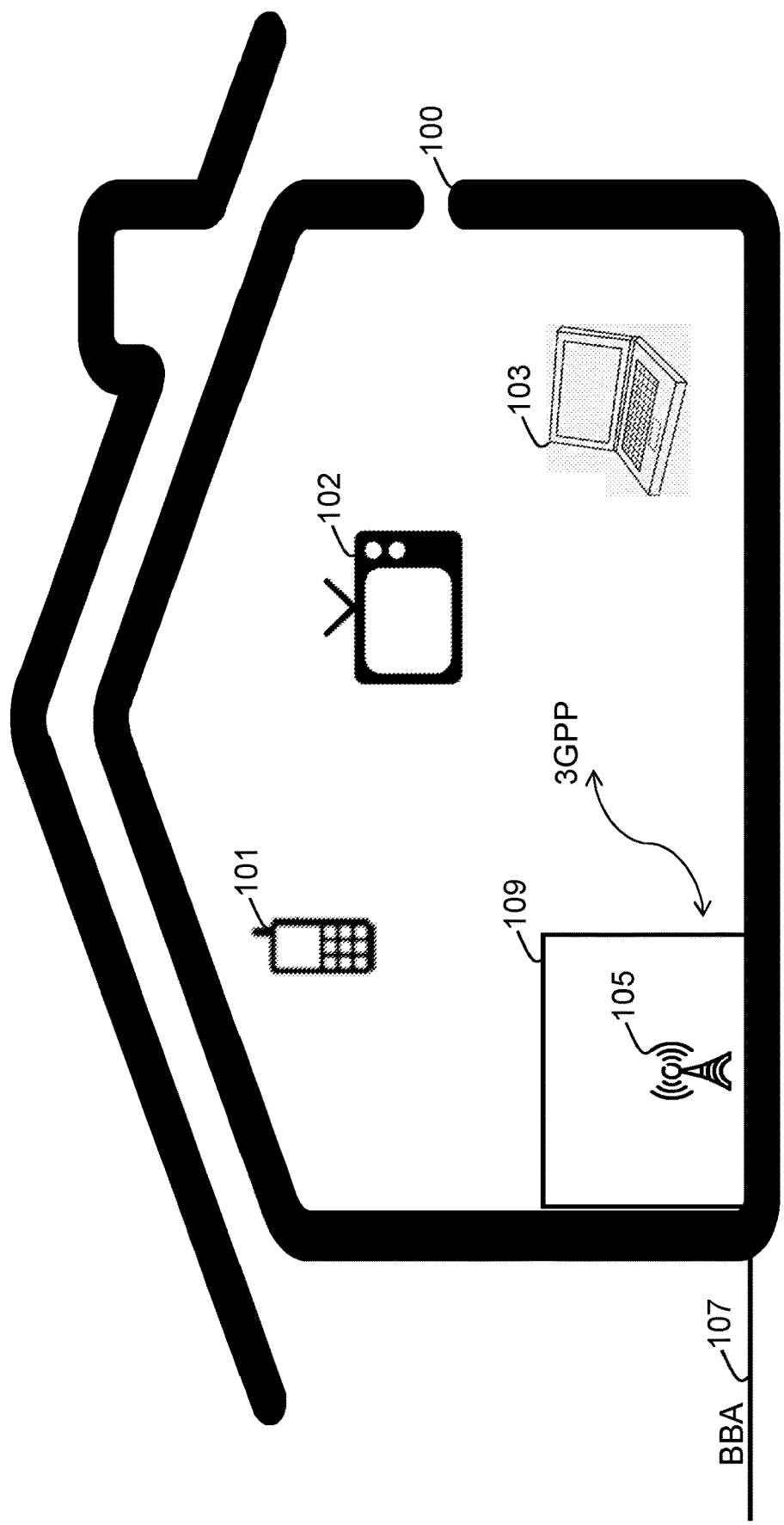
FIG. 1 is an illustrative example of an indoor environment featuring an indoor base station and indoor service node, according to some of the example embodiments presented herein.

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the term wireless device, wireless terminal, IoT device and user equipment may be used interchangeably.

Overview

The example embodiments presented herein are directed towards an indoor base station and an indoor service node configured to provide 3GPP based communications for at least one wireless device in an indoor environment. The example embodiments have been described with the use of a residential home as an example indoor environment. It should be appreciated that the example embodiments may be applied to any other indoor environment.

It is projected that most wireless/mobile traffic will be generated indoor. A substantial part of that indoor traffic will be generated by devices in residential areas, and it is foreseen in general that all devices eventually will connect wirelessly to their various access points, be it WiFi, 3GPP or other. Irrespective of technology, such an access point shall be referred to herein as "wireless". Specifically, we do not necessarily need to distinguish between wireless and mobile at this stage.

The residential wireless access points that provide wireless connectivity will be connected to the rest of the network mainly via xDSL, for example, variants of DSL technologies, and xPON, for example, various Passive-Optical-Network technologies, links. The wireless access is managed and controlled separately from those fixed links. Specifically, In fixed broadband access networks (BBA), the access points, for example WiFi or 3GPP femto, are deployed in the homes and are connected to the rest of the network via xDSL, xPON, etc. The wireless access points will be control my means of one type of system, for example, a WiFi controller and a Femto gateway, respectively. The fixed broadband access will by controlled by another type of system, typically complaint to the specifications emanating from the Broadband Forum (BBF).

Existing systems treat the wireless link, for example, WiFi and 3GPP, as an extension of a fixed link. The existing systems are vastly dominated by a "fixed broadband access agenda". This agenda serves the purpose of terminating any radio solution in the home, and quickly transforming that solution into something that fits nicely under various BBA/BBF paradigms. In addition, in current systems, the assumption is that a wireless link is just one of several services provided by a Customer Premises Equipment (CPE).

Yet, everything in the homes is going wireless and so exploring means of optimizing the entire end-to-end solution for wireless devices in the homes is needed. The trend of everything going wireless has now reversed the roles of wireless and wireline. Specifically, the mindset should now be how to optimize wireline to support wireless, not how to treat wireless as an extension of wireline.

Thus, a need exists for an end-to-end solution capable of addressing the need for increased wireless connectivity inside a residential, or in general an indoor, environment. At least one object of some of the example embodiments presented herein is to present a system in which wireless access is merged with broadband access in order to increase wireless connectivity in an indoor environment.

The example embodiments described herein optimize the distribution network for wireless operation in an indoor environment. The CPE delivered for deployment in the indoor environment may be, according to some of the example embodiments, viewed as a small radio base station, optimized for BBA deployment, whose sole purpose it is to provide wireless connections for wireless devices in the indoor environment. No other service type is necessary to consider. As a consequence, the DSL/PON line, for example, the BBA, is used in its entirety by the base station connected. A corollary is that the DSL/PON line may be put under total control of the base station's access/resource controller.

According to some of the example embodiments, a legacy wireline service in the indoor environment may be emulated as a tethered service over wireless access. In cases where the CPE is required, for example, by national regulation, to provide wireline service to the homes, for example, via an Ethernet port on the CPE for in-home devices to connect to, then this wireline service shall be treated as a tethered device. This will simplify the entire infrastructure providing residential connectivity services, since that infrastructure can focus on providing 3GPP bearer connectivity.

FIG. 1 illustrates the providing of any service to an indoor environment with the use of 3GPP bearer services and how therefore all resources providing those services may be put under the total control of 3GPP bearer control, including radio resource control. The indoor environment 100 of FIG. 1 is a residential home. The indoor environment features a number of wireless devices including, but not limited to, a user equipment 101, a television 102 and a computer 103. FIG. 1 further illustrates an indoor base station 105. The indoor base station 105 may be in the form of a CPE or any other means of providing an indoor base station known in the art. According to some of the example embodiments, the indoor base station 105 may be provided within an indoor service node 109. Both the indoor base station 105 and the indoor service node 109 may be in connectivity with a BBA 107 which is dedicated for communications between the indoor base station 105/indoor service node 109 and the radio network. Specifically, the BBA is scheduled and controlled by the indoor base station for communications between the indoor base station and the radio network.

The indoor base station 105 receives 3GPP communications via a wireline connection, for example, the BBA 107. The indoor base station 105 thereafter transmits the 3GPP based communications to the various wireless devices 101-103 in the indoor environment 100. The transmission provided by the indoor base station 105 is done via a wireless connection.

Figure 2:
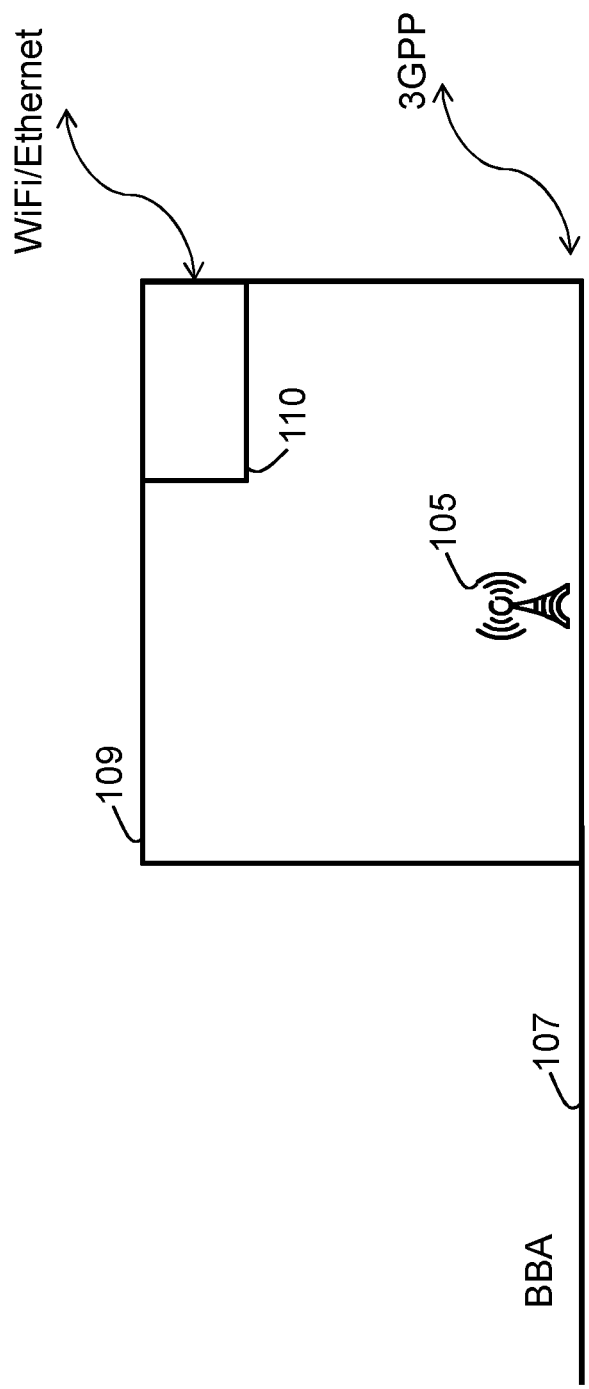
FIG. 2 illustrates an example of the indoor base station and indoor service node of FIG. 1 further comprising an emulated user equipment, according to some of the example embodiments presented herein.

FIG. 2 illustrates the indoor service node 109 of FIG. 1, further featuring an emulated user equipment 110, according to some of the example embodiments. The emulated user equipment 110 may be used as a tethering device in which a WiFi connecting and/or an Ethernet connection may be provided to any of the various wireless devices. According to some of the example embodiments, the emulated user equipment 110 is solely a hardware component, for example, not comprising a speaker or microphone of a typical handset device, which may perform the same functions as a typical user equipment.

Thus, through the BBA 107, the indoor service node 109 will receive the 3GPP based communications. Thereafter, the indoor service node 109 may provide the 3GPP based communications to any of the wireless devices via a wireless connection with the use of the indoor base station 105. The indoor service node 109 may also provide the 3GPP based communications via a WiFi access point provided by the emulated user equipment 110. The indoor service node 109 may also provide the 3GPP based communications via the Ethernet access point, which is also provided by the emulated user equipment 110.

The emulated user equipment may be viewed as a device that provides WiFi radio access and optionally Ethernet backhauling. WiFi radio access parts may be implemented by the emulated user equipment as a tethering service. Alternatively, the WiFi access point comprises a separate discrete component. In this case, the Ethernet interface is provide by the tethering user equipment as well. Hence, this tethered, or fixed, Ethernet service interface may also be used for any service inside the indoor environment that still wants to use fixed Ethernet and not wireless services.

Thus, as illustrated in FIG. 2, inside the indoor service node, aside from the BBA modem, there are two distinguishable entity groups. Apart from the entities inside the emulated user equipment, the entities in the indoor service node are the ones implementing the indoor base station which is a small RBS for deployment in the indoor environment, for example, a femto or femto-cell, or similar. According to some of the example embodiments, the indoor base station comprises a protocol stack configured to support a residential small cell architecture. Alternatively, the indoor base station may be in the form of a full RBS.

According to some of the example embodiments, the indoor base station and/or indoor service node is connected to via the BBA to a Digital Subscriber Line Access Multiplexer (DSLAM) somewhere higher up in the network, for example a central office. Since the BBA line is used only for connecting the indoor base station, which is typically embedded with a BBA modem, all resources provided by the BBA line to the indoor environment are under the control of the indoor base station. Thus, the BBA modem is controlled by the indoor base station, for example, via a radio resource controller associated with the indoor base station. Such a radio resource controller may be located in the indoor service node or it may be centralized within a central office or DSLAM.

Therefore, if a wireless device in the indoor environment wishes to establish a new LTE/5G connection via the indoor service node, the indoor service node may handle all BBA resources of the indoor service node as used exclusively for radio bearers. In current systems, the BBA line is used by many entities, for example, a fixed service and a wireless service, thus mandating a separate resource/access controller for the BBA to arbitrate between the different services wanting to use the BBA. The example embodiments presented herein provide for a merged system with centralized control.

According to some of the example embodiments, the emulated user equipment is configured to emulate any service as a user equipment connecting via a standard radio bearer to the home indoor base station. This is achieved by the emulated user equipment inside the indoor service node. The emulated user equipment has the purpose of acting as an embedded tethering device, taking any type of packet service from the indoor environment, and tethering it over a 3GPP bearer connectivity service. Internally, the emulated user equipment may be implemented by several means, including by using fictive physical layers in-between the entities (the indoor base station and emulated user equipment), denoted v5G/LTE.

Logically, the emulated user equipment and indoor base station parts of the indoor service node see one another as standard devices respectively. In order words, the indoor base station will not necessarily be able, or even interested, in distinguishing between an external user equipment, or wireless device, in the indoor environment and the internal emulated user equipment inside the indoor service node. The indoor base station will typically schedule all wireless devices that connect to it as per 3GPP standards.

Figure 3:
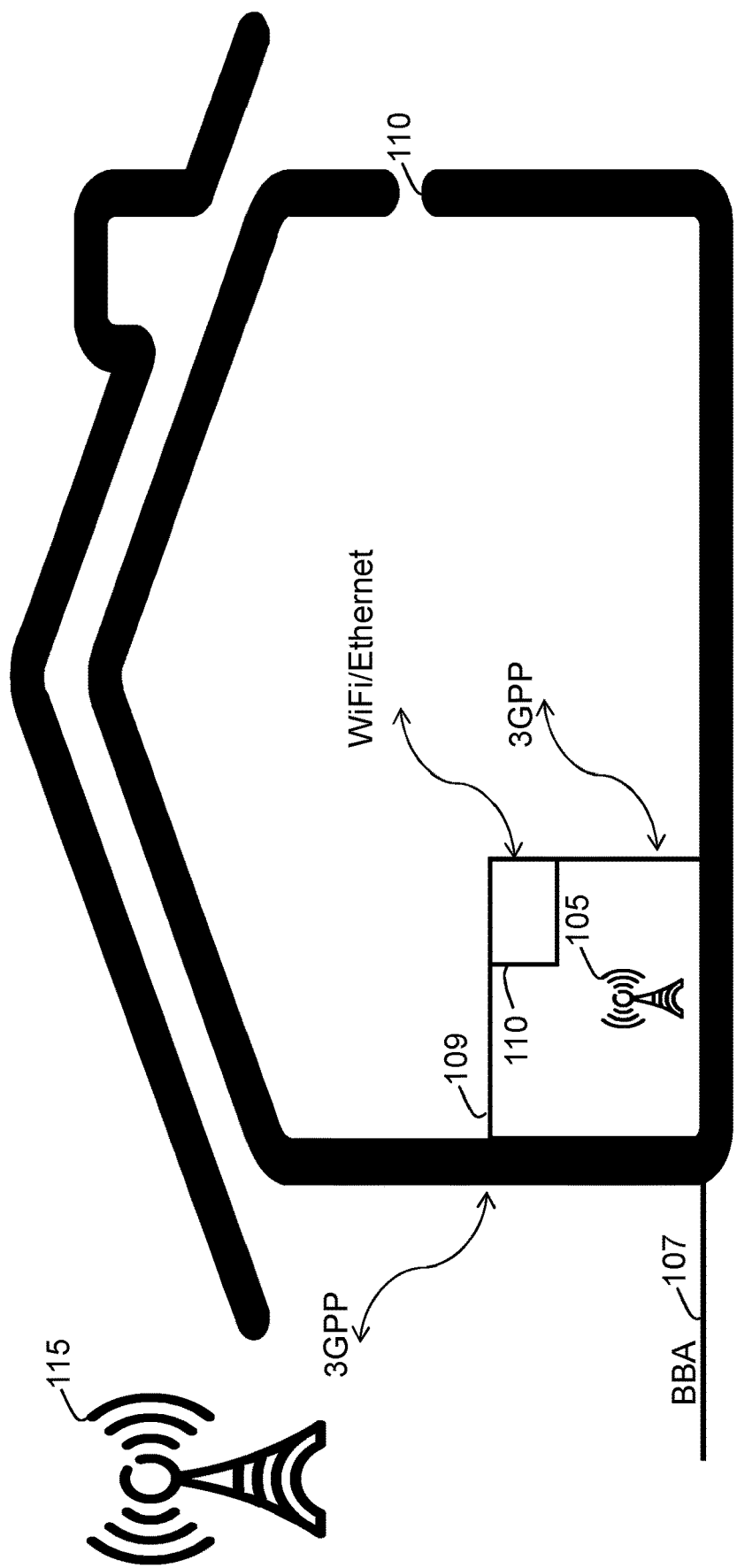
FIG. 3 is an illustrative example of the system of FIG. 2 further featuring the use of an outdoor base station, according to some of the example embodiments presented herein.

FIG. 3 illustrates the indoor service node 109 of FIG. 2 being used in conjunction with an outdoor radio base station 115. In the situation illustrated in FIG. 3, the BBA line 107 is complemented with a wireless backhauling link provided by the outdoor radio base station 115. This may be used to boost the peak capacity of the BBA, without incurring the prohibitive costs of upgrading the actual copper plants to achieve the same effect. In the situation illustrated in FIG. 3, traffic to/from the indoor wireless devices 101-103 would first be backhauled via the BBA, and when the peak cell rate of the indoor radio base station 105 surpass the capabilities of the BBA, the indoor service node 109 may pass excessive traffic over LTE instead. Later of course, LTE may be substituted for 5G when systems for fixed-wired access emerge using the latter.

In the system of FIG. 3, the use dual connectivity and multi-connectivity is employed, whereby many wireless connections may be bundled and treated as one, or as a grouped entity, for scalability reasons. The embedded user equipment in the indoor service node may have several links towards an outdoor environment. An example of such a link is one virtual wireless link over the indoor base station embedded in the indoor service node. Another example of such a link is a real 5G/LTE link via the outdoor radio base station, which may be connected to the same central office. The use of several links also implies that the embedded user equipment may dynamically select which wireless link to employ. The emulated user equipment may also select which radio base station, external or indoor, shall be a primary/master and which shall be the secondary/slave, for example, as per 3GPP dual connectivity, and later as per 5G multi-connectivity.

It should be appreciated that the use of an outdoor base station 115 allows for the indoor base station 105 to use the wireless link provided by the outdoor radio base station 115, for example, by using the Ethernet interface of the embedded user equipment 110 and blocking such traffic from employing to avoid tromboning. It should further be appreciated that tethering could also occur outside of the indoor base station.

Example Node Configuration

Figure 4:
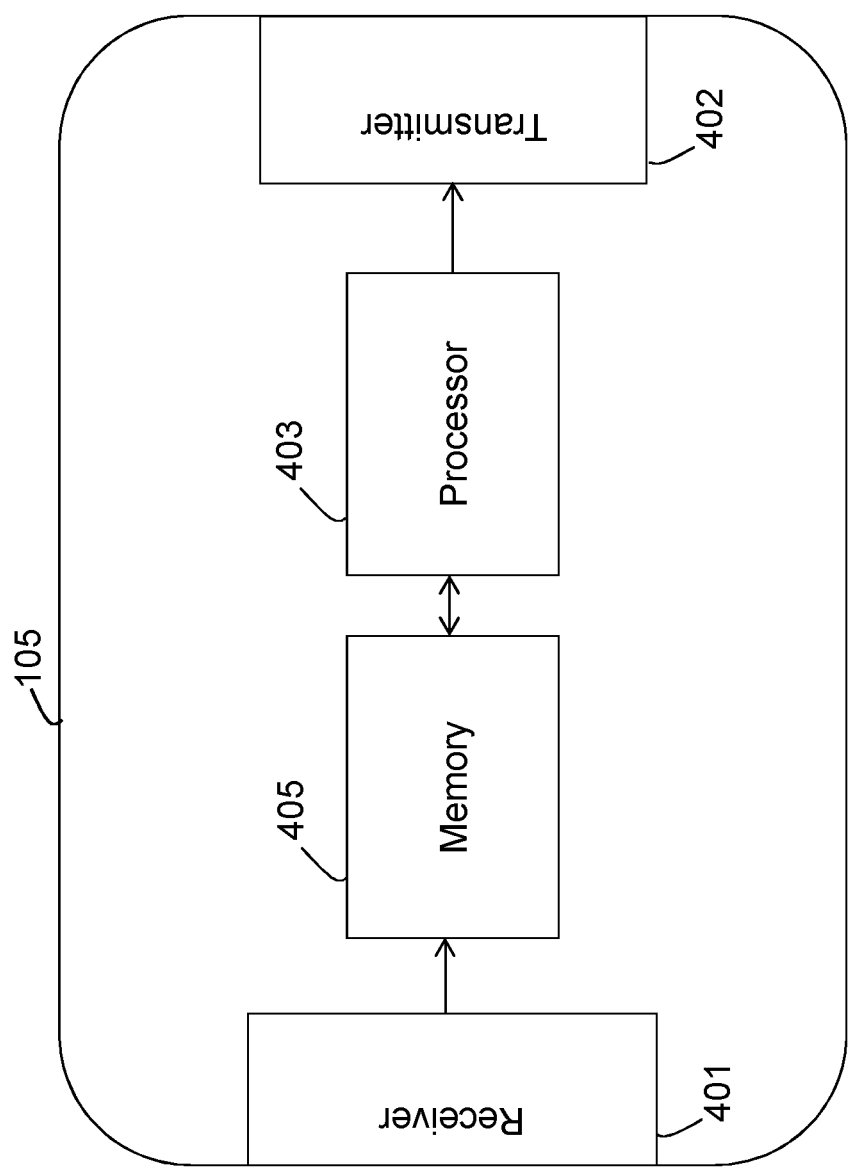
FIG. 4 is an example node configuration of the indoor base station of FIGS. 1-3, according to some of the example embodiments presented herein.

FIG. 4 illustrates an example node configuration of the indoor base station 105. The indoor base station 105 may provide 3GPP based communications to at least one wireless device in an indoor environment, according to the example embodiments described herein.

The indoor base station 105 may comprise a receiver 401 that may be configured to receive communication data, instructions, and/or messages. The indoor base station 105 may also comprise a transmitter 402 that may be configured to transmit communication data, instructions, and/or messages. It should be appreciated that the receiver 401 and transmitter 402 may be comprised as any number of transceiving, receiving, and/or transmitting units, modules or circuitry. It should further be appreciated that the receiver 401 and transmitter 402 may be in the form of any input or output communications port known in the art. The receiver 401 and transmitter 402 may comprise RF circuitry and baseband processing circuitry (not shown).

The indoor base station 105 may also comprise a processing unit or circuitry 403 which may be configured to assist in the providing of 3GPP based communications as described herein. The processing circuitry 403 may be any suitable type of computation unit, for example, a microprocessor, digital signal processor (DSP), field programmable gate array (FPGA), or application specific integrated circuit (ASIC), or any other form of circuitry or module.

The indoor base station 105 may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Figure 5:
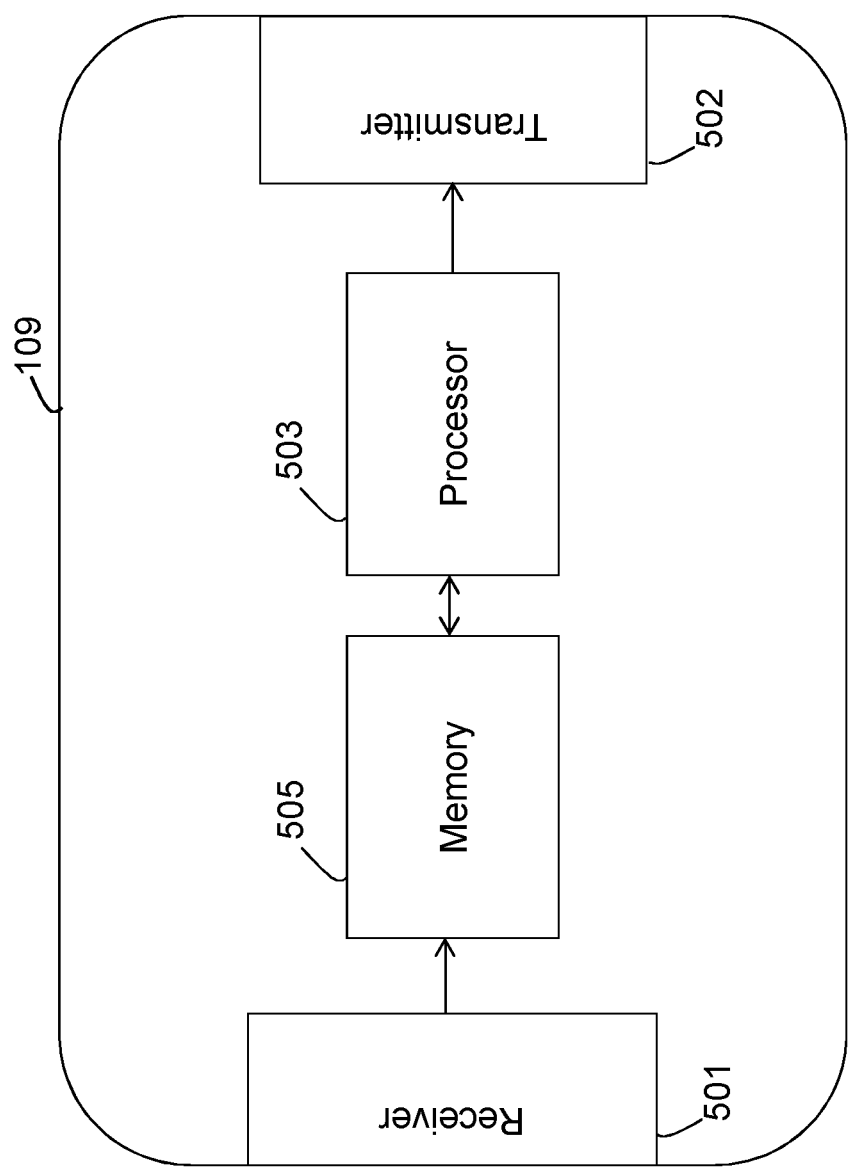
FIG. 5 is an example node configuration of the indoor service node of FIGS. 1-3, according to some of the example embodiments presented herein.

FIG. 5 illustrates an example node configuration of the indoor service node 109. The indoor service node 109 may provide 3GPP based communications to at least one wireless device in an indoor environment, according to the example embodiments described herein.

The indoor service node 109 may comprise a receiver 501 that may be configured to receive communication data, instructions, and/or messages. The indoor service node 109 may also comprise a transmitter 502 that may be configured to transmit communication data, instructions, and/or messages. It should be appreciated that the receiver 501 and transmitter 502 may be comprised as any number of transceiving, receiving, and/or transmitting units, modules or circuitry. It should further be appreciated that the receiver 501 and transmitter 502 may be in the form of any input or output communications port known in the art. The receiver 501 and transmitter 502 may comprise RF circuitry and baseband processing circuitry (not shown).

The indoor service node 109 may also comprise a processing unit or circuitry 503 which may be configured to assist in the providing of 3GPP based communications as described herein. The processing circuitry 503 may be any suitable type of computation unit, for example, a microprocessor, digital signal processor (DSP), field programmable gate array (FPGA), or application specific integrated circuit (ASIC), or any other form of circuitry or module.

The indoor service node 109 may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Example Node Operations

Figure 6A:
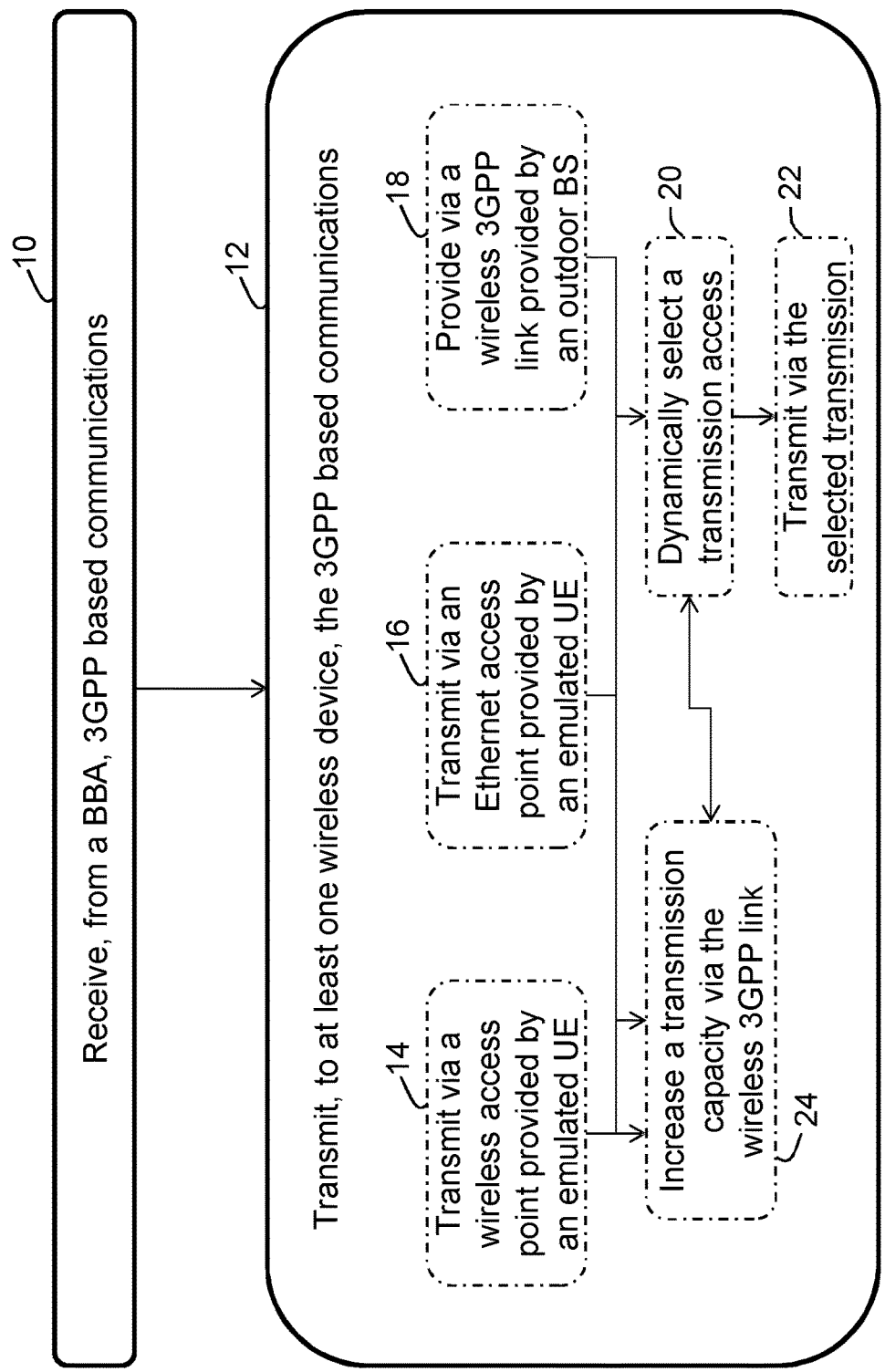
FIG. 6A is a flow diagram depicting example operations performed by the indoor base station and indoor service node, according to some of the example embodiments.

FIG. 6A is a flow diagram depicting example operations which may be taken by the indoor base station and the indoor service node for providing 3GPP based communications to at least one wireless device in an indoor environment as described herein. It should be appreciated that the indoor base station and the indoor service node comprise a processor and a memory. The memory comprises instructions executable by the processor whereby the indoor base station and the indoor service node are operative to perform the operations described in FIG. 6A.

It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 6B:
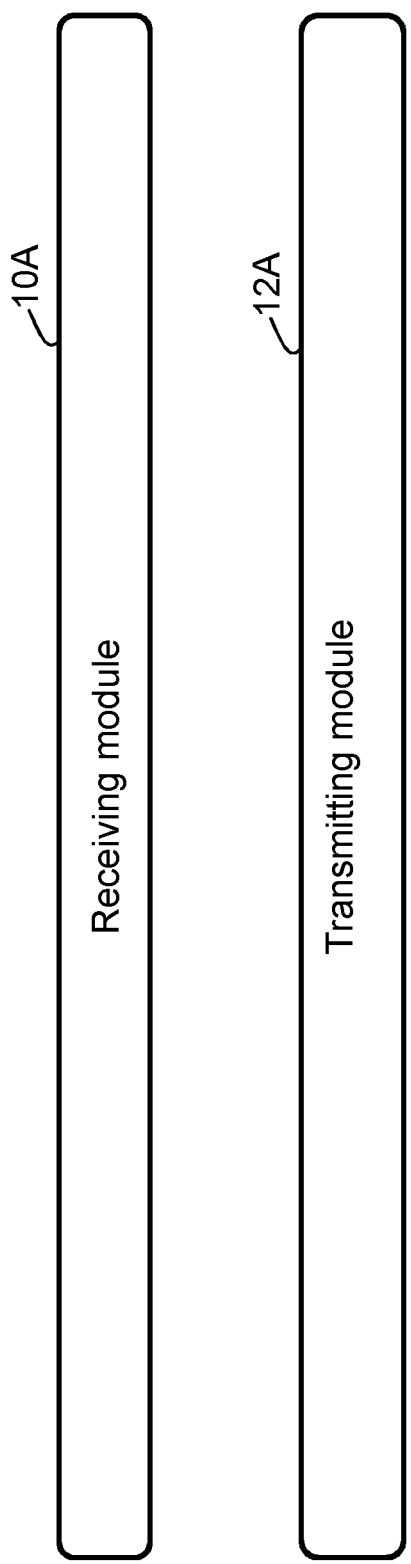
FIG. 6B is an illustration of modules configured to perform at least some of the operations of FIG. 6A, according to some of the example embodiments.

FIG. 6B is a module diagram depicting modules which may perform at least some of the operations of FIG. 6A.

Operation 10

The indoor base station 105 is configured to receive 10, from a radio network via a BBA 107, the 3GPP based communications. The BBA is scheduled and controlled by the radio network and the indoor base station for communications between the indoor base station and the radio network.

As described in conjunction with FIGS. 1-3, the BBA is dedicated for communications between the indoor base station and the radio network. Thus, the BBA is controlled, for example, via a radio resource controller associated with the indoor base station 105. It should be appreciated that the BBA may comprise a fiber optic connection, a digital subscriber line, a wireless link or a cable network.

It should be appreciated that according to some of the example embodiments, the indoor base station 105 may be fully comprised within the indoor service node. According to other example embodiments, portions of the indoor base station may be comprised within the radio network.

Operation 12

The indoor base station 105 is further configured to transmit 12, to the at least one wireless device, the 3GPP based communications. Thus, as illustrated in FIGS. 1-3, the indoor base station 105 is configured to transmit the 3GPP based communications to the wireless devices via a wireless connection.

Example Operation 14

According to some of the example embodiments, the indoor service node 109 comprises the indoor base station 105 described above. The indoor service node 109 further comprises an emulated user equipment 110 configured to establish a back-to-back connection with the indoor base station 105. The indoor service node 109 is configured to transmit 14, to the at least one wireless device, the 3GPP based communications via a wireless access point provided by the emulated user equipment.

As described in at least FIG. 2 and the corresponding text, the emulated user equipment may receive the 3GPP based communications from, for example, the indoor base station 105. The emulated user equipment may in turn function as a wireless access point and provide the communications via a WiFi connection.

It should be appreciated that the WiFi access point may be a tethered WiFi access point or any other non-3GPP radio access type. It should be appreciated that the WiFi access point may also be used to support 3GPP based device to device communications as well as any other future wireless technologies.

Example Operation 16

According to some of the example embodiments, the indoor service node is further configured to transmit 16, to the at least one wireless device, the 3GPP based communications via an Ethernet access point provided by the emulated user equipment. It should be appreciated that a USB access point may also be provided by the emulated user equipment.

As described in at least FIG. 2 and the corresponding text, the emulated user equipment may function as a tethering device where the emulated user equipment provides WiFi radio access and optionally Ethernet backhauling. Alternatively, the WiFi access point may be comprised as a separate discrete component, in such case, the Ethernet interface is provided by the emulated, tethering, user equipment.

Example Operation 18

According to some of the example embodiments, the emulated user equipment 110 is dually connected to the indoor base station 105 and an outdoor base station 115. In such instances, the indoor service node 109 is further configured to provide 18 3GPP based communications with the outdoor radio base station via a wireless 3GPP link.

Example operation 18 is illustrated in FIG. 3. As shown in FIG. 3, the indoor service node 109, and in turn the emulated user equipment 110, may be dually connected to both the outdoor radio base station 115 and the indoor radio base station 105. In such a scenario, when the peak cell rate of the indoor radio base station surpasses the capabilities of the BBA, the indoor base station may pass excessive traffic over the wireless 3GPP link associated with the outdoor base station.

Example Operation 20

According to some of the example embodiments, the indoor service node 109 is further configured to dynamically select 20 a transmission access among the wireless access point, Ethernet or Universal Serial Bus access point or wireless 3GPP link.

As illustrated in FIG. 3, the indoor service node will receive 3GPP based communications from the BBA 107. The indoor service node may transmit the received 3GPP communications via the indoor radio base station over a wireless link. The indoor base station may also transmit the received 3GPP communications over a WiFi or Ethernet or Universal Serial Bus access point provided via the emulated user equipment. The indoor service node may also route traffic to/from the outdoor radio base station over a wireless 3GPP link.

Example Operation 22

According to some of the example embodiments, once the indoor service node 109 dynamically selects 20 the transmission access, the indoor service node 109 may be further configured to transmit 22, to the at least one wireless device, the 3GPP based communications via the selected transmission access.

Example Operation 24

According to some of the example embodiments, the indoor service node 109 is further configured to increase 24 a transmission capacity of the 3GPP based communications over the wireless access point or the Ethernet or Universal Serial Bus access point via the wireless 3GPP link associated with the outdoor radio base station. Example operation 24 is described further in at least FIG. 3 and the corresponding text.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM and 5G, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. An indoor service node, comprising:
an indoor base station, situated in an indoor environment, for providing Third Generation Partnership Project, 3GPP, based communications for at least one wireless device in the indoor environment, the indoor base station comprising: a first processor and a first memory, said first memory comprising instructions executable by said first processor, whereby said indoor base station is operative to:
  receive, from a radio network via a Broadband Access, BBA, the 3GPP based communications, said BBA being scheduled and controlled by the radio network and the indoor base station for communications between the indoor base station and the radio network, wherein the BBA is dedicated for communications between the indoor base station and the radio network; and
  transmit, to the at least one wireless device, the 3GPP based communications;
an emulated user equipment configured to establish a back-to-back connection with the indoor base station and further configured to emulate a service as a user equipment connecting to the indoor base station; and
a second processor and a second memory, said second memory comprising instructions executable by said second processor whereby said indoor service node is operative to:
  transmit, to the at least one wireless device, the 3GPP based communications via a wireless access point provided by the emulated user equipment.

2. The indoor base station of claim 1, wherein the BBA comprises a fiber optic connection, a digital subscriber line, a wireless link, or a cable network.

3. The indoor service node of claim 1, wherein the indoor service node is further operative to transmit, to the at least one wireless device, the 3GPP communications via an Ethernet or Universal Serial Bus access point provided by the emulated user equipment.

4. The indoor service node of claim 3, wherein the emulated user equipment is dually connected to the indoor base station and an outdoor radio base station, said outdoor radio base station providing 3GPP communications via a wireless 3GPP link.

5. The indoor service node of claim 4, wherein the indoor service node is further operative to:

dynamically select a transmission access among the wireless access point, Ethernet or Universal Serial Bus access point or wireless 3GPP link; and transmit, to the at least one wireless device, the 3GPP communications via the selected transmission access.

6. The indoor service node of claim 4, wherein the indoor service node is further operative to increase a transmission capacity of the 3GPP communications, on the BBA, wireless access point or the Ethernet or Universal Serial Bus access point, via the wireless 3GPP link.

7. A method in an indoor service node comprising an indoor base station situated in an indoor environment for providing Third Generation Partnership Project, 3GPP, based communications for at least one wireless device in the indoor environment, and further comprising an emulated user equipment configured to establish a back-to-back connection with the indoor base station and further configured to emulate a service as a user equipment connecting to the indoor base station, the method comprising:

receiving, by the indoor base station from a radio network via a Broadband Access, BBA, the 3GPP based communications, said BBA being scheduled and controlled by the radio network and the indoor base station for communications between the indoor base station and the radio network, wherein the BBA is dedicated for communications between the indoor base station and the radio network;

transmitting, by the indoor base station to the at least one wireless device, the 3GPP based communications; and transmitting, by the indoor service node to the at least one wireless device, the 3GPP communications via a wireless access point provided by the emulated user equipment.

8. The method of claim 7, wherein BBA comprises a fiber optic connection, a digital subscriber line, a wireless link, or a cable network.

9. The method of claim 7, further comprising transmitting, to the at least one wireless device, the 3GPP communications via an Ethernet or Universal Serial Bus access point provided by the emulated user equipment.

10. The method of claim 7, wherein the emulated user equipment is dually connected to the indoor base station and an outdoor radio base station, the method further comprising providing 3GPP communications with said outdoor radio base station via a wireless 3GPP link.

11. The method of claim 10, further comprising:

dynamically selecting a transmission access among the wireless access point, Ethernet or Universal Serial Bus access point or wireless 3GPP link; and transmitting, to the at least one wireless device, the 3GPP communications via the selected transmission access.

12. The method of claim 11, further comprising increasing a transmission capacity of the 3GPP communications, on the BBA, wireless access point or the Ethernet or Universal Serial Bus access point, via the wireless 3GPP link.

* * * * *